July 30, 1968
H. SEDLACEK
3,394,419
ROAD CONSTRUCTION
Filed March 29, 1966
6 Sheets-Sheet 3
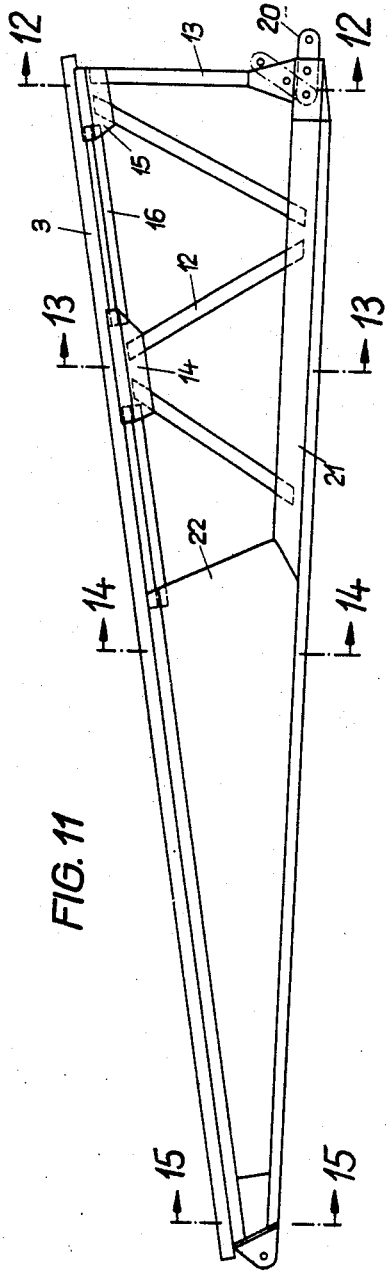
Inventor:
Hugo Sedlacek
By: Spencer & Hays
Attorneys

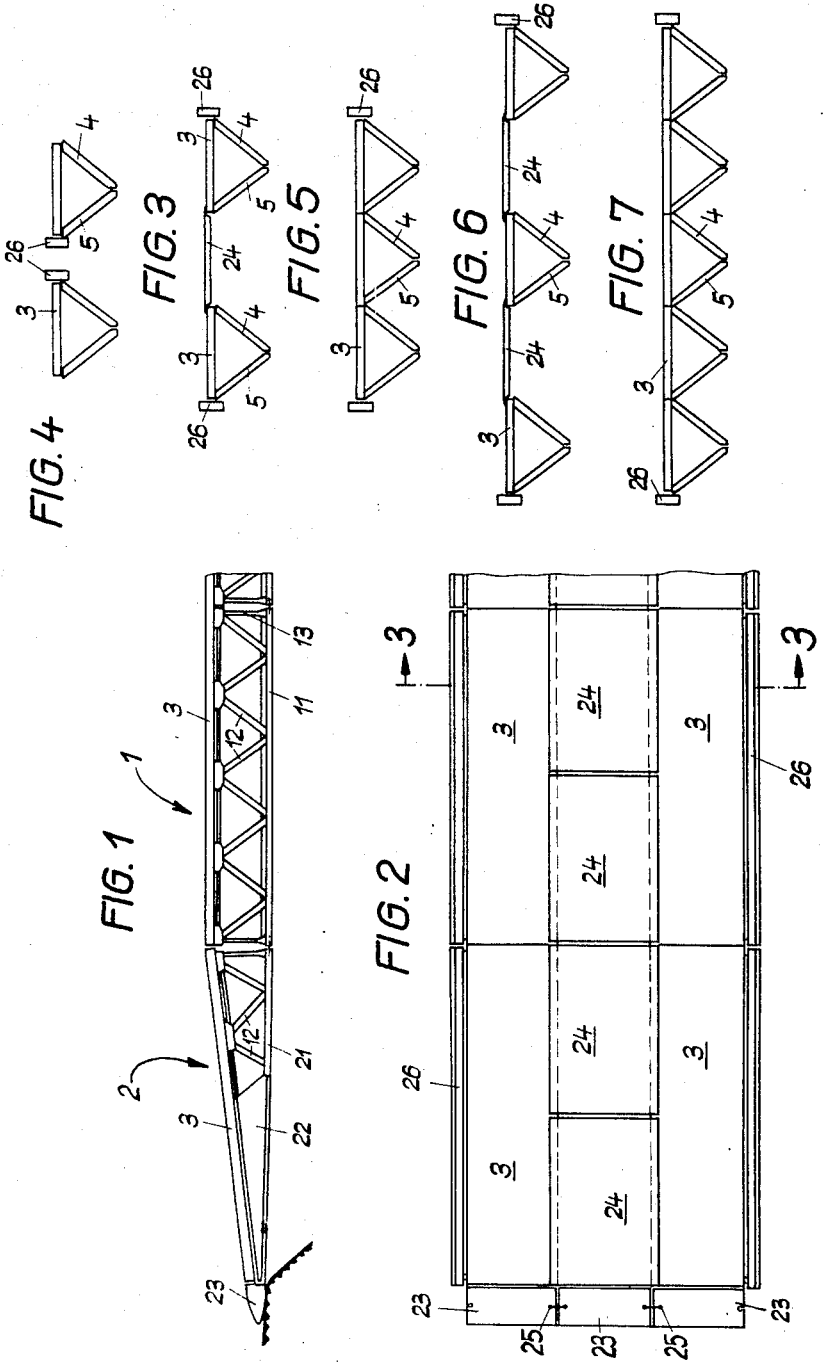

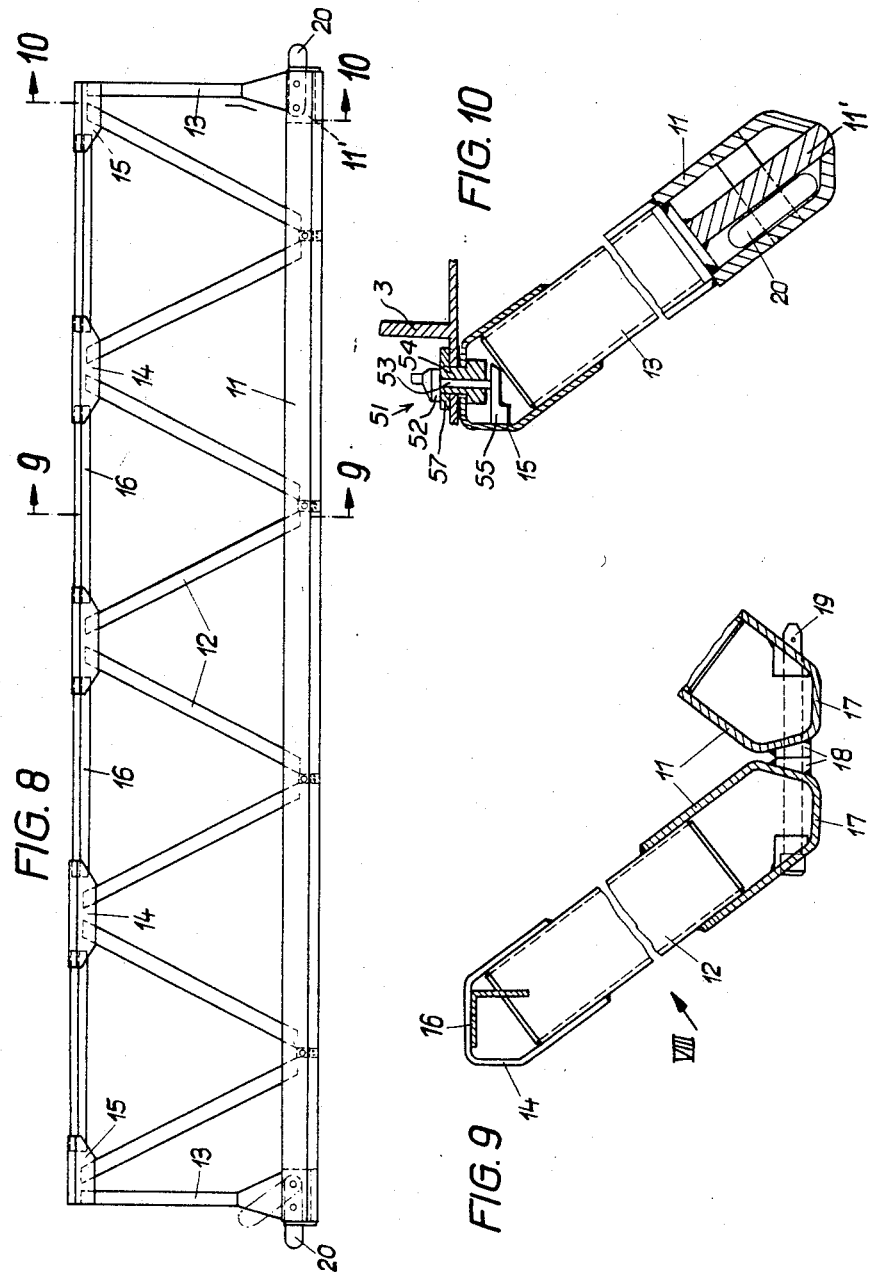

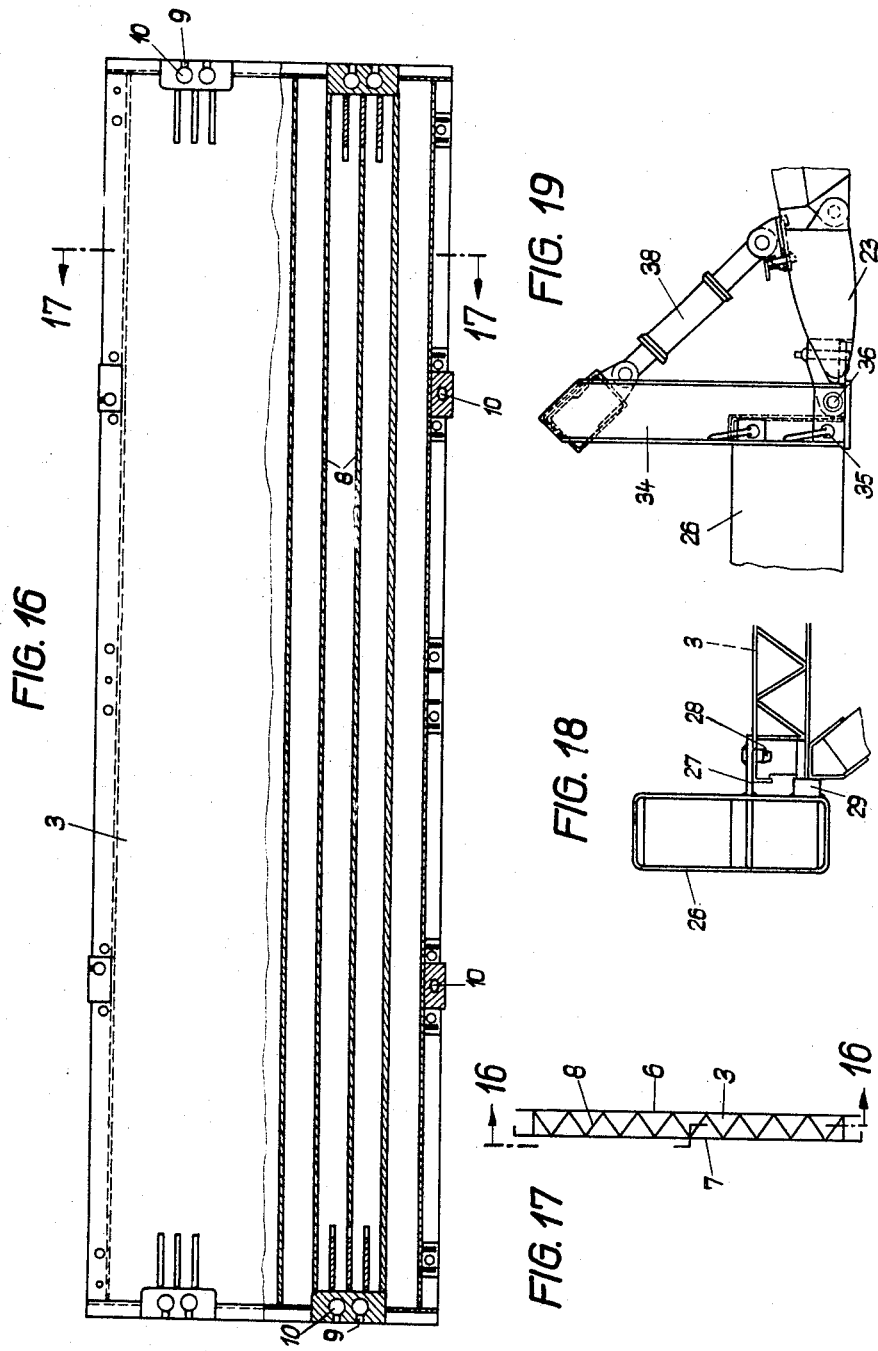

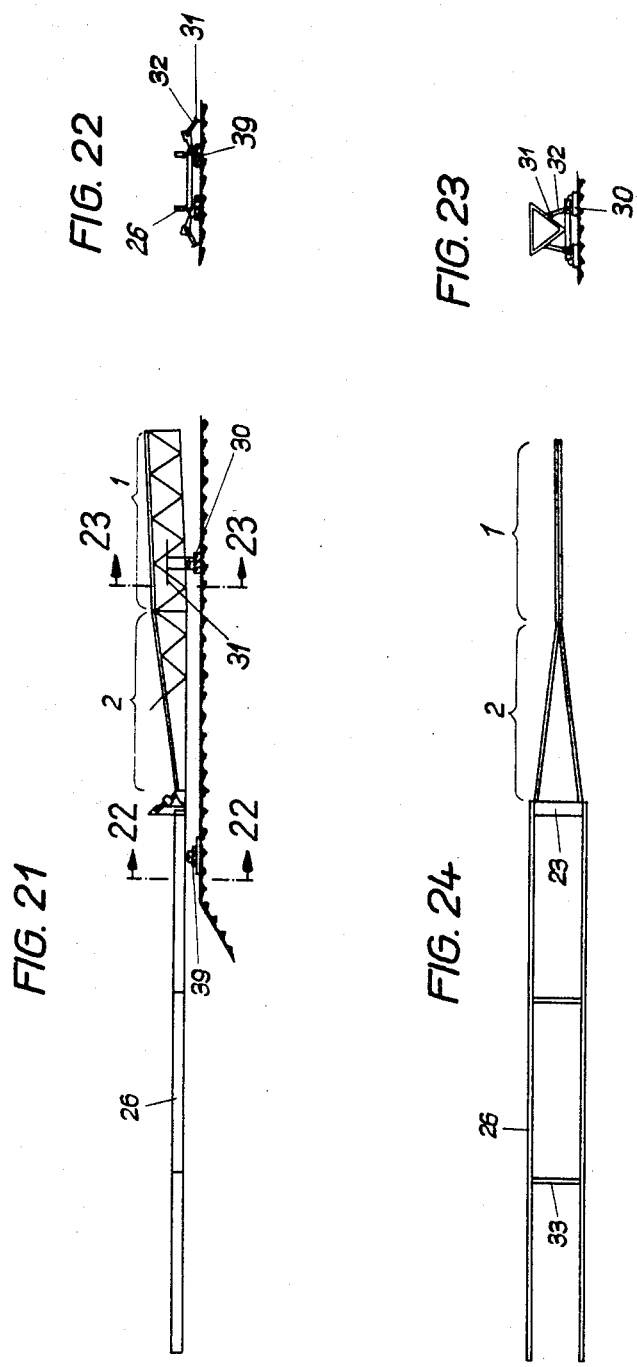

United States Patent Office

3,394,419
Patented July 30, 1968

3,394,419
ROAD CONSTRUCTION
Hugo Sedlacek, Rheinhausen, Germany, assignor to Beteiligungs- und Patentverwaltungsgesellschaft mit beschrankter Haftung, Essen, Germany
Filed Mar. 29, 1966, Ser. No. 538,328
Claims priority, application Germany, Apr. 9, 1965, B 81,379
7 Claims. (Cl. 14—13)

ABSTRACT OF THE DISCLOSURE

A temporary roadway unit including a plurality of main supporting elements each having a triangular cross section and each being composed of a roadway plate constituting the top chord of the element and two inclined plates detachably connected together and defining the other legs of the triangular cross section, each inclined plate having its lower edge defining one half of the bottom chord of the element and each inclined plate being composed of diagonal rods extending from the bottom to the top of the inclined plate and a plurality of non-load supporting connecting rods connecting together the upper ends of the diagonal rods.

---

The present invention relates to the field of road construction, and particularly to the construction of short, simple-span, dismountable bridges.

It has already been suggested to provide a dismountable bridge with prefabricated main supporting elements having a triangular cross section. These elements are assembled to form a deck bridge in which the upper chord is constituted by a sheet metal plate forming the bridge roadway or track. The bottom chord of each element is formed as a closed box from which extends a V-shaped sheet metal structure whose upper ends are connected to the upper chord. The main supporting elements are connected together by transverse supporting members in such a manner that a girder-truss structure which is resistant to bending and torsion is formed.

It is a primary object of the present invention to provide an improved form of construction for the elements of such a bridge.

Another object of the present invention is to provide bridge elements having a simple construction.

Another object of the present invention is to provide readily transportable bridge elements.

Yet another object of the present invention is to provide bridge elements which can be assembled to form a bridge having any desired width.

These objects are achieved according to the present invention by the provision of a track unit for a dismountable deck bridge, which unit includes a plurality of main supporting elements having a triangular cross section. Each element is essentially constituted by a roadway plate defining one leg of the triangular cross section and two inclined plates defining the other legs of the triangular cross section. The roadway plate constitutes the top chord of the element, while each inclined plate has its upper edge supporting a respective lateral edge of the roadway plate and its lower edge defining one half of the bottom chord of the element.

Also according to the present invention, each unit further includes two tapering ramp elements, one at each end thereof, each having its large end connected to one of the main elements. Each ramp element includes a ramp roadway plate constituting the top chord of the ramp element and two ramp inclined plates each having an upper edge detachably supporting a respective lateral edge of the ramp roadway plate and a lower edge defining one half of the bottom chord of the ramp element. The bottom chord halves are detachably connected together at the large end of the ramp element to give the large end a triangular cross section. These bottom chord halves diverge toward the tapered end of the ramp element to give the tapered end a trapezoidal cross section.

Additonal objects and advantages of the present invention will become apparent upon consideration of the following description when taken in conjunction with the accompanying drawings in which:

FIGURE 1 is a partial elevational view of a first embodiment of the present invention.

FIGURE 2 is a plan view of the arrangement shown in FIGURE 1.

FIGURE 3 is a cross-sectional view taken along the plane defined by the line 3—3 of FIGURE 2.

FIGURE 4 is a cross-sectional view similar to that of FIGURE 3 showing a modified form of construction of the embodiment of FIGURE 3.

FIGURE 5 is a cross-sectional view similar to that of FIGURE 3 showing a modified form of construction of the embodiment of FIGURE 3.

FIGURE 6 is a cross-sectional view similar to that of FIGURE 3 showing a modified form of construction of the embodiment of FIGURE 3.

FIGURE 7 is a cross-sectional view similar to that of FIGURE 3 showing a modified form of construction of the embodiment of FIGURE 3.

FIGURE 8 is a side view of an element of the arrangement of FIGURE 1 taken in the direction of the arrow VIII of FIGURE 9.

FIGURE 9 is a cross-sectional view taken along the plane defined by the line 9—9 of FIGURE 8.

FIGURE 10 is a cross-sectional view taken along the plane defined by the line 10—10 of FIGURE 8.

FIGURE 11 is a side view of another element of the arrangement of FIGURE 1.

FIGURE 12 is a cross-sectional view taken along the plane defined by the line 12—12 of FIGURE 11.

FIGURE 13 is a cross-sectional view taken along the plane defined by the line 13—13 of FIGURE 11.

FIGURE 14 is a cross-sectional view taken along the plane defined by the line 14—14 of FIGURE 11.

FIGURE 15 is a cross-sectional view taken along the plane defined by the line 15—15 of FIGURE 11.

FIGURE 16 is a partial cross-sectional plan view of another element of the arrangement of FIGURE 1 taken along the plane defined by the line 16—16 of FIGURE 17.

FIGURE 17 is a cross-sectional view taken along the plane defined by the line 17—17 of FIGURE 16.

FIGURE 18 is an end, cross-sectional view of a portion of the element of FIGURE 16.

FIGURE 19 is a partial side view showing an arrangement for use in installing the arrangement of FIGURE 1.

FIGURE 21 is a side view of an arrangement for moving the device of FIGURE 1 into position.

FIGURE 22 is a cross-sectional view taken along the plane defined by the line 22—22 of FIGURE 21.

FIGURE 23 is a cross-sectional view taken along the plane defined by the line 23—23 of FIGURE 21.

FIGURE 24 is a bottom plan view of the arrangement shown in FIGURE 21.

Figure 20:
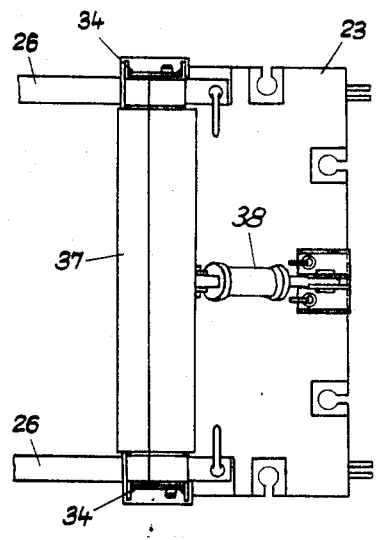
FIGURE 20 is a plan view of the arrangement of FIGURE 19.

Referring first to FIGURES 1 to 3, there is shown a deck bridge track unit constructed of main supporting elements 1 and ramp elements 2. Each main supporting element 1 includes a hollow truss plate 3 which forms a part of the bridge roadway and two inclined truss plates 4 and 5 which cooperate with the truss plate 3 to form a structure having a triangular cross section, as may best be seen in FIGURE 3.

As is shown in FIGURES 16 and 17, the hollow truss plate 3 is preferably composed of an an upper cover plate 6, a lower cover plate 7 and diagonal stringers 8 positioned between the cover plates and forming triangular passages which extend along the entire length of the truss plate. The plate 3 is enclosed on all sides so that it will be floatable in water. The truss plate is provided at its end faces and along its sides with slots 9 and communicating circular passages 10 into which plate couplings may be inserted for connecting each truss plate with adjacent truss plates, or other plates, in such a manner that the assembly of plates will resist bending and torsion in every direction.

Said plate couplings are described in the Austrian Patent 237,665.

Such plate couplings extend in each case beyond their respective butt joints and each plate coupling is inserted into butt joints having slots of different dimensions.

Referring once again to FIGURES 1 to 3, each of the truss plates 4 and 5 includes a sheet metal ledge 11 defining the lower portion of the plate and one half of the bottom chord of the element and having a U-shaped cross section, as may be best seen in FIGURE 9. Each of the plate 4 and 5 is also composed of a plurality of diagonal rods 12 and end posts 13 having their lower ends inserted into ledge 11. The rods 12 and 13 are constituted by sheet metal boxes having rectangular transverse cross sections. These rods 12 and end posts 13 preferably have their lower ends welded to ledge 11. The upper ends of every adjacent pair of rods 12 are connected together by means of a sheet metal piece 14 which also has a U-shaped cross section, as may also be seen in FIGURE 9. The diagonal rod at each extremity of the bridge element has its upper end connected to its adjacent end post 13 by means of a sheet metal piece 15 which also has a U-shaped cross section, as is shown in FIGURE 10. The sheet metal pieces 14 and 15 are connected together by means of L-shaped rods 16. The rods 16 do not constitute load supporting members of the element but merely serve for holding the rods 12 and post 13 together, for purposes of transportation. They are made of a light metal alloy, while the other parts of each truss plate 4 and 5 are made of steel. The hollow truss plate 3 is preferably made of an aluminum alloy and forms the upper chord of the member.

The attachment of the truss plate 4 and 5 to the hollow truss plate 3 is preferably effectuated in such a manner that the arrangement can readily be disassembled, this being carried out for example, by means of eccentric couplings.

Such a coupling is described in the Belgian Patent 591,226.

A coupling of this type is shown at 51 in FIGURE 10 to include a sleeve 54 which passes through sheet metal piece 15, the bottom flange of plate 3 and a washer 57. Sleeve 54 fits through a hole in the bottom flange of plate 3 with relatively small clearance so that it prevents the plate 3 from sliding on the support in any horizontal direction and receives the shear forces occurring between elements 3 and 4 or 5. Sleeve 54 is provided with a shoulder portion which abuts against the bottom surface of piece 15 when the sleeve is in position. The sleeve may be held in this position, for example, by being rigidly connected to support 55, which is rigidly connected to piece 15, or by means of a spring element between the sleeve and the support 55 for urging the sleeve shoulder against the lower surface of piece 15.

A bolt 53 is journalled in the sleeve 54 for rotation about an axis which is eccentric, or laterally displaced, with respect to the axis of the sleeve 54. At the upper end of the bolt 53 is a cylindrical disc 52 whose diameter is slightly smaller than that of sleeve 54. The center line of disc 52 is eccentric, or laterally displaced, with respect to the center line, or axis, of bolt 53. The eccentricity of the center line of bolt 53 with respect to that of sleeve 54 is approximately equal to the eccentricity of the center line of disc 52 with respect to that of bolt 53. Consequently, the disc 52 can be brought, by rotation of the bolt 53, to a position in which its axis is in line with the axis of sleeve 54. In this free position, the disc 52 will not project laterally beyond sleeve 54 and the plate 3 and washer 57 can then be mounted from, or mounted, on sheet metal piece 15.

In order to firmly connect the plate 3 to the sheet metal piece 15, the plate 3 and washer 57 are brought into position so that their respective holes fit around sleeve 54, and disc 52 is rotated through an angle of 180° to the position shown in FIGURE 10. The two eccentricities described above will then have a cumulative effect so that a relatively large portion of disc 52 engages at one side against washer 57 and thus holds plate 3 firmly against piece 15.

A spring may be provided between the bottom of sleeve 54 and the lower portion of bolt 53 in order to press disc 52 against washer 57. The bolt 53 is prevented from upward movement by its connection to support 55, which connection can be of any known type, and can consist, for example, of a cotter pin passing laterally through bolt 53 and held by suitable surfaces of support 55.

The sheet metal pieces 15 and 16 are arranged so that their upper edges form supporting surfaces for the hollow truss plate 3. The sheet metal ledges 11 of the two plates 4 and 5 of each support element are assembled together as shown in FIGURE 9 to form the bottom chord for the element. Ledges 11 have their lower surfaces flattened to form contact surfaces 17 which will support the main supporting element 1 during installation. The lower edges of ledges 11 are positioned side by side through the intermediary of eyes 18 and are held in this position by means of coupling bolts 19.

Disposed at the ends of the ledges 11 are coupling straps 20 (FIGURES 8 and 10) by means of which the lower chords of two successive supporting or ramp elements are connected together. As is shown in FIGURE 10, the metal ledges 11 are provided at each end with a bisecting wall 11' which divides the ledge end into two pockets one of which receives a coupling strap 20. The strap 20 is arranged on one side of its wall 11' and the strap 20 at the other end of the ledge is arranged on the other side of its wall. By this arrangement, the strap in one end of each ledge is offset with respect to the strap in the other end thereof.

Referring now to FIGURES 11 to 15, there is shown in greater detail a tapered ramp element 2. This element is also constituted by a hollow truss plate 3 and two inclined lateral side plates. However, this element does not have a triangular cross section throughout its length. Rather, the cross section passes from a triangular shape at the end where the ramp element joins a main supporting element 1 to a trapezoidal shape at the other end thereof. As a result, the two halves of the bottom chord of the ramp element diverge from the point where the element is connected to a main supporting element to the tapered end of the ramp element, as is shown diagrammatically in FIGURE 24.

The lateral plates of the ramp element are constituted by truss frameworks at the large end thereof and by sheet metal plates 22 at the tapered end thereof. The trussing framework portions are constructed in a manner analogous to that of the main bearing element truss plates 4 and 5 shown in FIGURES 8 to 10. This trussing framework includes diagonal rods 12, end posts 13, sheet metal pieces 14 and 15, L-shaped connecting rods 16, and U-shaped sheet metal ledges 21 constituting the bottom chord halves of the ramp element. At the large end of the ramp element, each ledge 21 is provided with a bisecting wall 21' for connecting a strap 20. The manner in which these elements are assembled is shown in FIGURES 11 to 13.

The tapered ends of the ramp element inclined plates are constituted by sheet metal plates 22 whose lower ends constitute the remainder of the bottom chord halves for the ramp element. The roadway portion of the ramp element is constituted by the hollow truss plate 3 which rests on and is detachably connected to, the upper surfaces of sheet metal pieces 14 and 15 and plates 22. The arrangement of plates 22 and truss plate 3 is shown in FIGURES 14 and 15.

The taper of the ramp element is such that its upper surface has an inclination of approximately 8% with respect to the horizontal and its bottom chord has an inclination of approximately 3% with respect to the horizontal.

As is shown in FIGURES 1 and 2, the tapered end of each ramp element 2 has connected thereto a shore sill, or foot, 23 whose length in a transverse direction is equal to the width of one track unit constituted by supporting elements 1 and 2.

Referring once again to FIGURES 1 to 3, it may be seen that one embodiment of a complete bridge structure according to the present invention is constructed with two parallel arrangements of track units separated from one another by a distance approximately equal to the width of one truss plate 3. This distance is bridged by further hollow truss plates 24 which are provided with flat ledges along the edges of their upper surface by means of which they are supported between the separated plates 3. Each plate 24 is half as long as its associated plates 3. The two parallel track units are held together at their ends by means of three shore sills 23 which are connected together by means of plate couplings 25 in such a manner that they are resistant to bending in every direction.

The completed bridge is provided along its edges with protective railings 26 which are constituted by sheet metal boxes having a rectangular cross section.

One such railing is shown in detail in FIGURE 18 to include a plurality of longitudinally spaced horizontal straps 27 and a similar plurality of bearing blocks 29, both of which are welded to one vertical wall of the railing 26. Each strap 27 is provided with a downwardly projecting pin 28 which engages in a suitable passage in the upper surface of plate 3 for supporting the railing 26 in position. Other forms of bridge construction utilizing the elements according to the present invention are shown in FIGURES 4 to 7. As is shown in FIGURE 4, a single track bridge is constructed from two parallel track units disposed parallel to one another and spaced apart by a small distance. In this embodiment, the railings 26 are disposed adjacent to one another along the inside edges of the units.

The bridge construction shown in FIGURE 5 includes three parallel track units whose upper truss plates 3 are connected together in such a manner that the assembly is capable of resisting bending in any direction. As a result, this construction does not require any additional cross members.

FIGURES 6 and 7 show forms of construction in which two vehicle tracks or lanes are provided. The arrangement of FIGURE 6 includes three parallel track units spaced apart from each other by a distance equal to the width of one unit. The spaces between these units are bridged by additional hollow truss plates 24. The arrangement of FIGURE 7 employs five track units with adjacent truss plates 3 rigidly connected together.

A bridge construction using elements according to the present invention is capable of being placed in position and assembled or disassembled in a rapid and simple manner. One of the advantages of the form of construction of the present invention is that each track unit can be individually placed in position across the space to be bridged. As a result, it is only necessary to provide sufficient apparatus to roll one track unit into position for constructing a bridge having any number of parallel track units, and hence any desired width. One procedure for positioning the bridge is illustrated in FIGURES 21 to 24.

As is shown in FIGURE 21, each track unit including a leading ramp element 2 and at least one main element 1 is rolled into position across a space to be bridged on a plurality of stationary roller jacks 30 and 39. The first main element 1 has the surfaces 17 of its bottom chord supported on the roller of jack 30. The element is maintained in an upright position by support 31 mounted on laterally pivotable arms 32, as is shown in FIGURE 23. The shore sill connected to ramp element 2 carries a projecting guide boom constituted by two railings 26 connected together by tie rods 33 to form a relatively rigid frame. This frame rests on the roller of a roller jack 39 which is also provided with laterally pivotable arms 32 and supports 31, the arms 32 being folded out of contact with the frame downwardly. The boom and set of elements 1 and 2 are rolled across the space to be bridged until the boom comes in contact with a roller jack 39 at the other side of the space. The track unit continues to be rolled across the space and sections of the boom are dismantled as the forward movement of the assembly continues. Once the track unit reaches its final position across the space, it rolls off the jacks and the jacks can be moved laterally into position for rolling the next track unit across the space. As the movement of the track unit progresses, the arms 32 of jack 39 will be pivoted upwardly into a position for supporting the sides of ramp element 2 and main elements 1.

The manner in which the boom consisting of railings 26 and tie rods 33 is connected to the shore sill 23 is shown in detail in FIGURES 19 and 20. The ends of railings 26 are held in position in posts 34 by coupling bolts 35. The posts 34 are secured to the shore sill 23 with the aid of coupling bolts 36 which are positioned transversely to the direction of movement of the assembly. A hydraulic jack 38 is pivotably connected between the upper side of shore sill 23 and a web 37 is connected between posts 34. The operation of jack 38 serves to position the boom composed of railings 26 and tie rods 33 at any angle with respect to the elements 1 and 2. This permits allowances to be made for differences in elevation between the two sides of the space to be spanned.

While one preferred form of construction for the supporting elements according to the present invention has been described in detail, it should be appreciated that other forms of construction can be employed without departing from the spirit of the present invention. For example, the side members 4 and 5 of the main elements can be made of single plates in place of the rods illustrated in details in FIGURES 8 and 10. Similarly, the entire lateral surfaces of the ramp elements 2 can also be made of solid plates.

In addition, in place of the strap connections 20 between the bottom chords of successive elements, hinges may be employed which permit a rotary movement of the elements about an axis transverse to the longitudinal dimension of the track unit.

It will be understood that the above description of the present invention is susceptible to various modifications, changes, and adaptations, and the same are intended to be comprehended within the meaning and range of equivalents of the appended claims.

What is claimed is:

1. A roadway unit for a dismountable deck bridge, which unit includes a plurality of main supporting elements having a triangular cross section, each of said elements comprising, in combination:

(a) a roadway plate constituting the top chord of said element and defining one leg of said cross section; and (b) two inclined plates detachably connected together and defining the other legs of said cross section, each of said inclined plates having its upper edge (detachably) supporting and detachably connected to a respective lateral edge of said roadway plate and its lower edge defining one-half of the bottom chord of said element; and each of said inclined plates being constructed in the form of a truss and comprising: a plurality of diagonal rods; two end posts, one at each end of said inclined plate; a sheet metal ledge extending along the entire length of said element, connecting together the lower ends of all of said diagonal rods and end posts, and forming the bottom chord half of said inclined plate; and a plurality of non-load supporting connecting rods connecting together the upper ends of said diagonal rods and end posts so as to cause each said inclined plate to define a lattice structure which retains its shape when said inclined plate is detached from its associated roadway plate.

2. An arrangement as defined in claim 1 wherein said ledge has a U-shaped configuration and a flattened lower surface for supporting said element, and each said inclined plate further comprises at least two coupling straps, one connected at each end of said ledge, for connecting said element to the adjacent elements of said unit.

3. An arrangement as defined in claim 1 wherein said unit further includes two tapering ramp elements, one at each end thereof, each having its large end connected to one of said main elements, each said ramp element comprising: a ramp roadway plate constituting the top chord of said ramp element; and two ramp inclined plates each having an upper edge detachably supporting a respective lateral edge of said ramp roadway plate and a lower edge defining one-half of the bottom chord of said ramp element; said bottom chord halves being detachably connected together at said large end of said ramp element to give said large end a triangular cross section, and diverging toward the tapered end of said ramp element to give said tapered end a trapezoidal cross section.

4. An arrangement as defined in claim 3 further comprising means coupling together adjacent pairs of roadway plates of said main and ramp elements for holding said roadway plates rigid with respect to one another against bending and torsion in any direction.

5. An arrangement as defined in claim 1 further comprising at least one protective railing and means connecting said railing to one lateral edge of said roadway plate.

6. An arrangement as defined in claim 1 further comprising: a projecting boom connected to one end of said unit for providing a temporary end support for said unit as it is being rolled into position across a space to be spanned; and means connected between said boom and said unit for rigidly connecting them together and for controlling the angular position of said boom with respect to said unit.

7. An arrangement as defined in claim 6 wherein said boom comprises: two longitudinally extending protective railings; and a plurality of transverse tie rods connected between said railing for giving said boom the form of a frame.

References Cited

UNITED STATES PATENTS

| | | | |
|---|---|---|---|
| 1,163,641 | 12/1915 | Cummings | 14—2 |
| 3,010,128 | 11/1961 | Gillois | 14—27 XR |
| 3,062,340 | 11/1962 | Hunnebeck | 14—13 XR |
| 3,103,025 | 9/1963 | Gassner et al. | 14—73 XR |
| 3,181,187 | 5/1965 | Kahn | 14—73 |
| 3,091,313 | 5/1963 | Colbath | 52—691 |

FOREIGN PATENTS

| | | |
|---|---|---|
| 231,499 | 1/1964 | Austria. |
| 23,639 | 1896 | Great Britain. |
| 859,175 | 5/1940 | France. |

JACOB L. NACKENOFF, *Primary Examiner.*